May 6, 1924.                                                      1,492,974
J. H. FOX
APPARATUS FOR SURFACING SHEETS
Filed March 18, 1922    9 Sheets-Sheet 2

FIG. 1ª.

INVENTOR
John H. Fox
by
James C. Bradley
atty.

May 6, 1924.

J. H. FOX

APPARATUS FOR SURFACING SHEETS

Filed March 18, 1922

INVENTOR
John H. Fox
By
James C. Bradley
Atty.

May 6, 1924.

J. H. FOX

1,492,974

APPARATUS FOR SURFACING SHEETS

Filed March 18, 1922

INVENTOR
John H. Fox
By
James C. ...
Atty.

Patented May 6, 1924.

1,492,974

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

APPARATUS FOR SURFACING SHEETS.

Application filed March 18, 1922. Serial No. 544,781.

*To all whom it may concern:*

Be it known that I, JOHN H. Fox, a citizen of the United States, and a resident of Pittsburgh, in the county of Allegheny and State of Pennsylvania, have made a new and useful invention in Apparatus for Surfacing Sheets, of which the following is a specification.

The invention relates to apparatus for surfacing sheets such as plate glass, marble or the like, the apparatus being illustrated and described as applied to the grinding and polishing of plate glass. It has for its principal object the provision of an improved straight away system or arrangement for handling the trucks or cars for carrying the glass beneath successive grinders and polishers. Certain embodiments of the invention are illustrated in the accompanying drawings wherein:

Fig. 1ᵃ is a similar view of the rear end of the apparatus.

Figure 1:
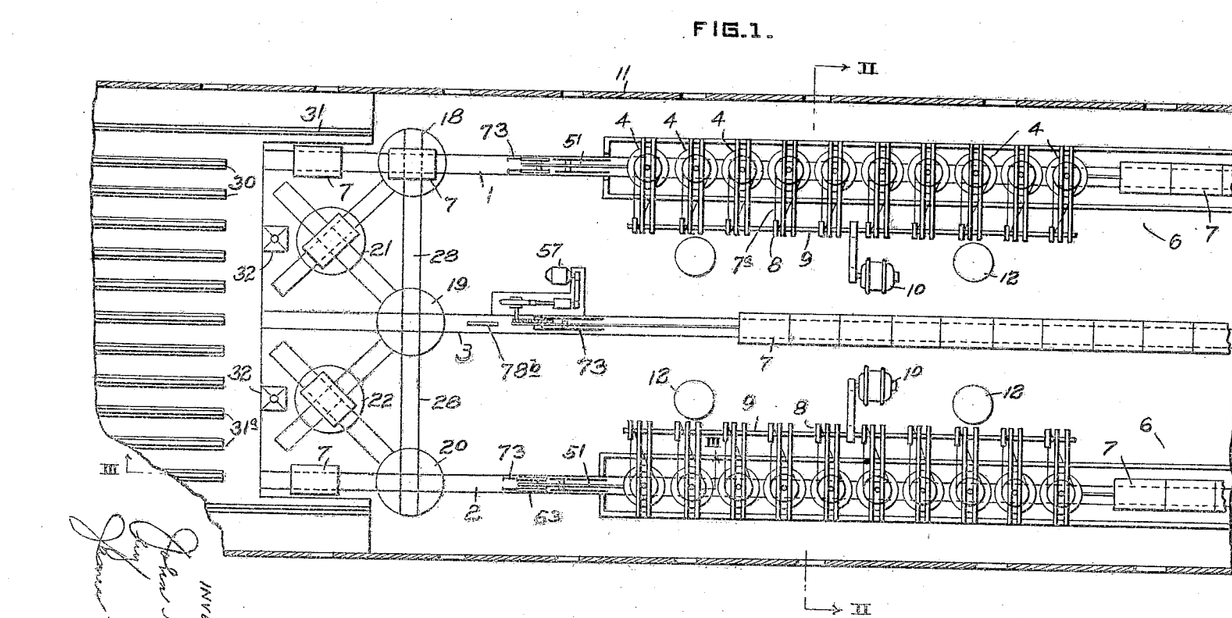
Figure 1 is a plan view of the forward end of one form of the apparatus.
Figure 1A:
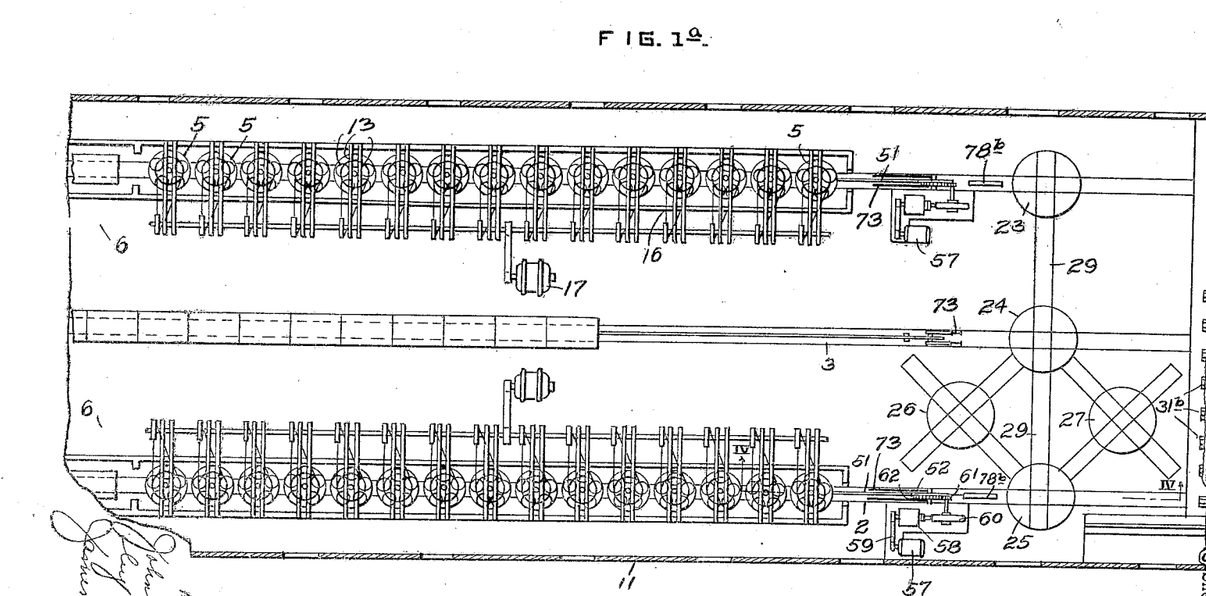

Referring to the general arrangement of Figs. 1 and 1ᵃ, 1, 2, and 3 are parallel tracks, 1 and 2 being what may be termed work tracks, since the trucks or cars passing along such tracks carry the glass plates or sheets being surfaced, while the track 3 may be termed a return track as it merely serves to bring the cars back to the starting end of the system. Arranged in series along the left hand or forward half of the tracks 1 and 2 are the grinders 4, while along the right hand or rear end of such tracks (Fig. 1ᵃ) are arranged the series of polishers 5. Spaces 6 are left between the sets of grinders and polishers to give an opportunity for cleaning the car and glass of abrasive between the abrading and polishing operations. The glass sheets to be ground are secured upon the tops of the trucks or cars 7 and these cars are connected and held against relative movement at their ends, as hereinafter described, so as to form a continuous train or bed, from the end of which the cars are removed one by one after they pass the last polishers, additional cars being added as required, at the other end of the train or series.

To state the operation briefly at this point, the cars with sheets of rough glass thereon are started at the left hand end of the track 1. These cars first pass beneath the grinders 4, where the glass is ground and smoothed by the use of abrasive of gradually increasing fineness. The sheets after passing the grinders are cleaned at the space 6 and then pass beneath the polishers 5, thus arriving at the right hand end of the track 1. The cars are then shifted laterally to the return track 3, and brought forward to the left hand end of the apparatus. At this point the glass is turned over on the cars to bring the unsurfaced side up, and the cars shifted to the tracks 2. This track with its grinders and polishers is a counterpart of the track 1 and the cycle of operation in grinding and polishing is the same as that described in connection with the track 1. At the right hand end of the track 2 the glass is removed and placed in the "finished racks", the empty cars now being shifted to the return track 3 and carried to the forward end of the system where they are refilled with sheets of glass and again sent through the cycle.

Figure 2:
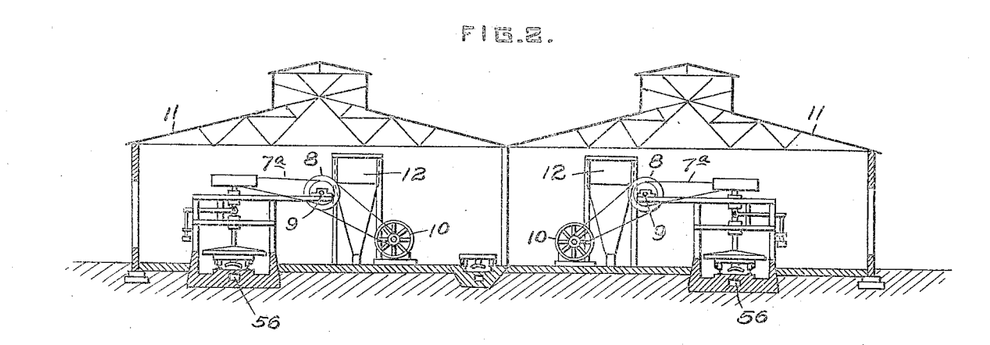
Fig. 2 is a transverse section on the line II—II of Fig. 1.

The number and kind of grinders employed will depend upon conditions, such as, the speed of movement of the cars, character of the abrasive and the like. They are preferably of the type shown in Fig. 2 with a single runner arranged to overhang the sides of the car and driven from the belts 7ᵃ passing around suitable pulleys 8 on the countershaft 9, which shaft is driven by the motor 10. Fig. 2 illustrates a suitable building structure 11 surrounding the apparatus and a sand grader 12 for grading the sand employed on the grinders, so that the right degree of fineness may be secured for each grinder.

The polishers 5 are preferably of the ordinary type, each consisting of a circular frame carrying a set of five discs 13 each of which carries a set of polishing felts, the polishers like the grinders are preferably arranged to overhang the sides of the cars and are driven from the countershaft by means of belts 16, the countershaft itself being driven by the motor 17 (Fig. 1ª). Rouge or other suitable polishing material and water are used in connection with the felts in the usual way, and the number of polishing machines is such as to secure the necessary polishing action.

At the left hand end of the tracks 1, 2 and 3 are the five turntables 18, 19, 20 21 and 22 and at the other end are the five turntables 23, 24, 25, 26, and 27. These turntables in connection with the cross tracks 28 and 29 provide for the necessary shifting of the cars between the three tracks, and also the necessary space required for storage of cars, for laying the glass, for stripping it, and for turning it over.

Figure 15:
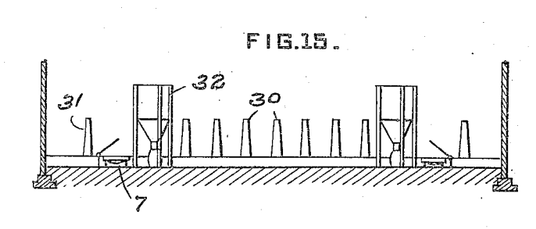
Fig. 15 is an end elevation of the rack arrangement of the Fig. 14 construction.

The glass to be ground is stored in the rough racks 30 (Fig. 1), and may be handled in placing upon the cars 7, preliminary to carrying along the track, in any desired way. Preferably the sheets are carried from the rough racks and placed upon their edges on the racks 31 (Figs. 1 and 15) arranged along the end of the track 1. From this position the glass sheets may be very easily swung around their lower edges, as indicated in Fig. 15 until they reach horizontal positions on the top of the cars. The sheets may be secured in position by means of plaster mixed in the mixers 32, but are preferably held by means other than plaster, as indicated in detail in Figs. 8 to 10.

Figure 6:
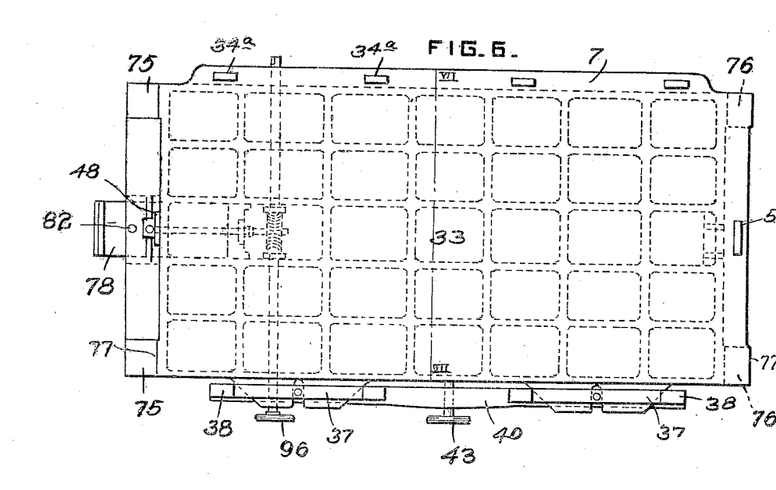
Fig. 6 is a plan view of the car.
Figure 7:
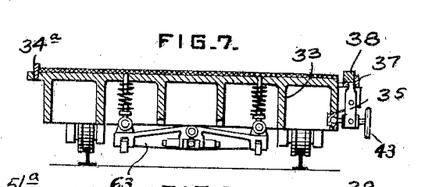
Fig. 7 is a transverse section on the line VII—VII of Fig. 6.
Figure 10:
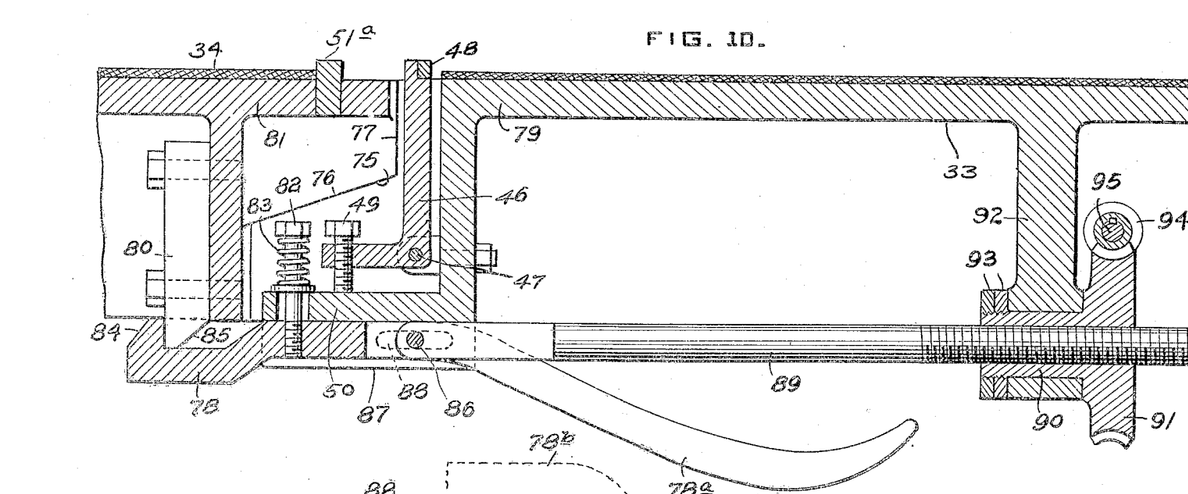
Fig. 10 is a longitudinal section on an enlarged scale through the end of two cars to illustrate the coupling device.

As indicated in Figs. 6 and 10, the car 7 comprises a cast metal body portion 33 upon whose surface is placed a fabric 34, preferably of yielding material, such as rubber which will make a good contact with the glass sheet when such sheet is pressed tightly into position and the air forced from between the two surfaces. The rubber is preferably moistened with water or some other liquid and when the sheet of glass is brought into tight contact with the wetted rubber, the pressure of the atmosphere tends to hold it securely against upward movement. Under these conditions, all that is necessary is to hold the glass against slipping laterally upon the table under the influence of the grinders and polishers. To accomplish this holding function, the glass is preferably clamped both at its side and end edges, although this clamping at both side and end edges may not be necessary in all cases.

Figure 8:
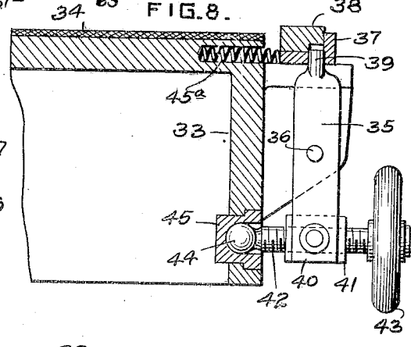
Figs. 8 and 9 are enlarged sectional and side elevation views respectively of the device for clamping the side edges of the sheets of glass.
Figure 9:
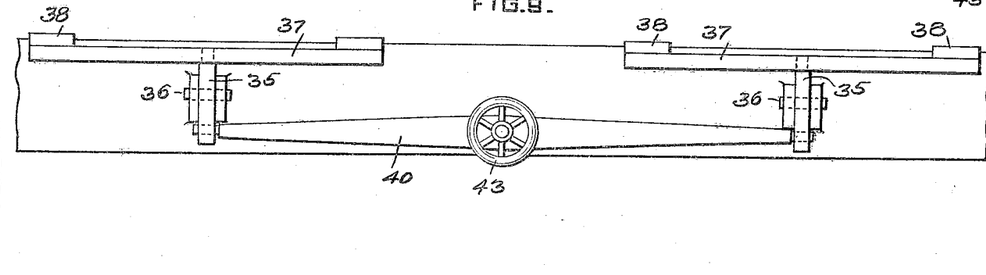

Along one side of the car is arranged a series of upwardly extending blocks 34ª (Fig. 6) whose upper ends lie below the top surface of the glass so as not to interfere with the grinders or polishers. On the other side of the table is a clamping arrangement for gripping the edge of the sheet and clamping it over against the blocks 34ª. This clamping device comprises a pair of vertical arms 35 (Figs. 8 and 9) pivoted at 36 upon suitable brackets projecting from the side of the car, and carrying at their upper ends bars 37 provided with the wood blocks 38 for engaging the edges of the glass sheet. As indicated in Fig. 8, the levers 35 are pivoted at their upper ends 39 in recesses in the middle of the bars 37 so that the pressure exercised by each of the levers can be equalized between its two blocks 38 engaging the edge of the sheet. This takes care of any irregularities in the edge of the glass sheet and prevents undue pressure being applied at any one point upon the edge of the sheet. In order to swing the lower ends of the levers 35 outward, the lever 40 is employed, pivoted at its ends to such levers 35 and provided at its central portion with the nut 41 through which is threaded the screw 42, provided at its outer end with the hand wheel 43 and at its inner end with the ball 44 engaging a suitable socket 45, fitting into the side of the car. Suitable springs 45ª fitting into recesses in the casting 33 serve to move the ends of the bars 37 outward as the hand wheel 43 is unscrewed.

In order to clamp the ends of the sheet, each car is provided at its end with a lever 46, pivoted at 47 (Fig. 10) and having a wood block 48 at its upper end for engaging the end edge of the sheet. The other arm of the lever is operated by means of the screw 49 threaded through the lever and engaging the flange 50 constituting a portion of the car body. The other end of the glass sheet is adapted to be engaged by a fixed wood block 51ª as indicated in Fig. 6 and Fig. 10. As in the case of the wood blocks for clamping the edges of the sheet, the end clamping blocks are also of a height such that their upper edges do not project above the surface of the glass and hence do not interfere with the grinding or polishing devices.

The cars are preferably carried along the tracks by means of endless cables, the upper flights of which are carried by suitable rollers intermediate the rails of the track, while the lower flights are carried in tunnels arranged beneath the tracks. The cars or trucks are each provided with gripping devices adapted to engage the cable and in this way secure the desired movement from one end of the track to the other. The gripping devices are preferably arranged so as to yieldingly grip the cable until moved to release position. This movement to release position is secured by means of cams placed adjacent the ends of the track and adapted to engage suitable levers and release the gripping device when the cars arrive at these points.

Figure 3:
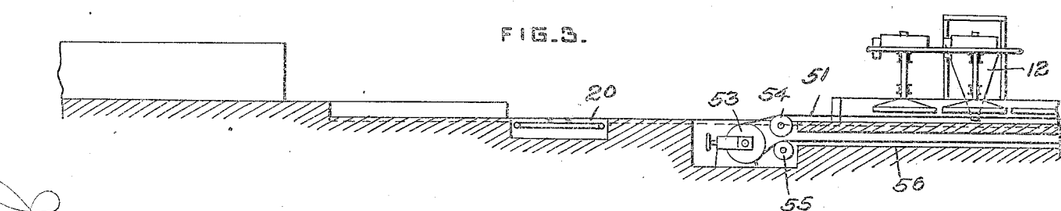
Fig. 3 is a longitudinal section on the line III—III of Fig. 1.
Figure 4:
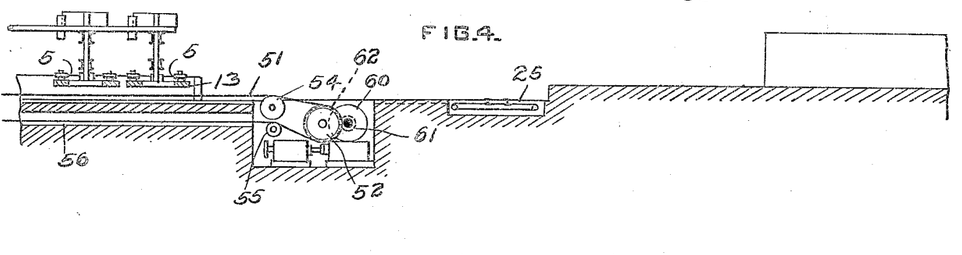
Fig. 4 is a longitudinal section on the line IV—IV of Fig. 1ᵃ.
Figure 5:
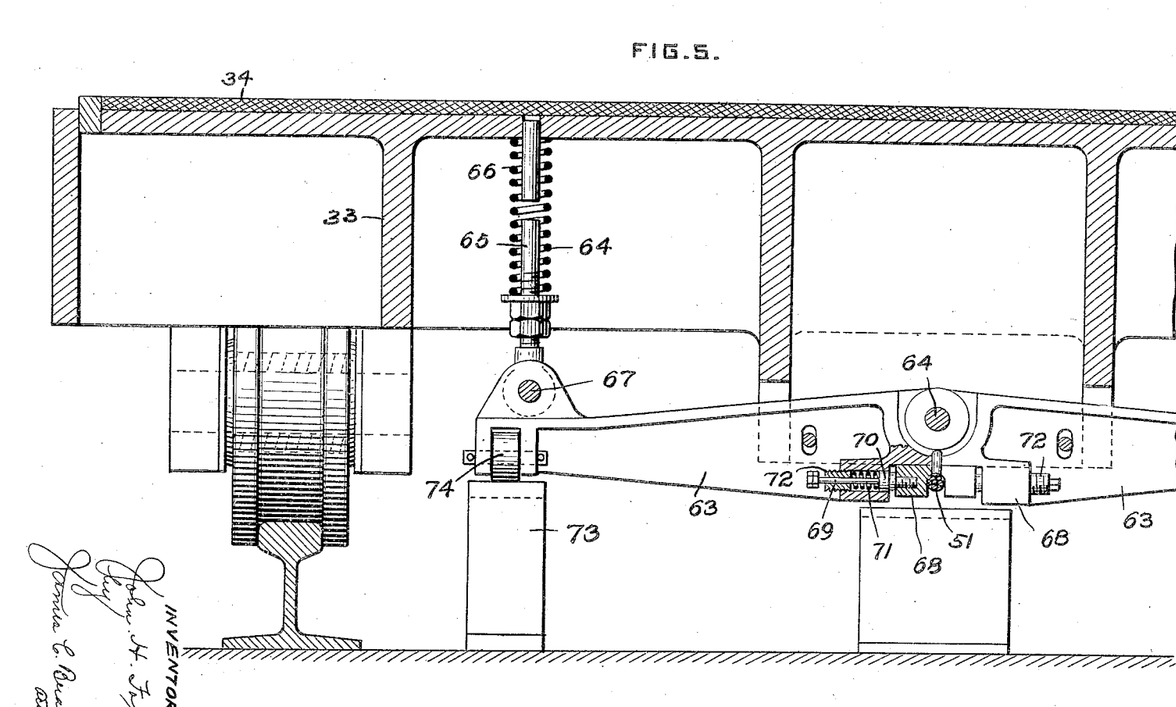
Fig. 5 is an enlarged transverse section through the central portion of one of the trucks or cars employed.

The mechanism for operating the endless cables and the arrangement of these cables for all three tracks is the same so that a description of one will be sufficient for all three. This arrangement will be readily understood by reference to Figs. 3 and 4 which show longitudinal sections at the ends of track 2. As here shown, the cable 51 passes around the drive pulley 52 at one end of track and around the take-up pulley 53 at the other end of the track. It is guided around the pairs of pulleys 54 and 55 and has its upper flight lying above the rails of the track as indicated in Fig. 5, while its lower flight extends through the tunnel 56 beneath the track. The drive pulley (Fig. 4) may be driven from any suitable power means, the mechanism shown comprising the motor 57, the reducing mechanism 58 driven by the belt 59, the worm drive 60 and the pinion 61 on the shaft of the worm wheel which engages a spur gear 62 carried by the shaft of the drive pulley 52.

The gripping mechanism will be understood by reference to Fig. 5, this mechanism being provided upon each car, preferably about midway between the ends thereof. The device comprises a pair of arms 63 pivoted at 64 to the body of the car, each of such arms being normally pressed down at its outer end by means of the spring 64, guided upon the rods 65 and 66. The rods 65 are pivoted at 67 to the ends of the arms 63. The arms are provided below the pivot 64 with the adjustable gripping blocks 68 adapted to receive the cable 51 between them. These blocks are carried by studs 69 threaded into the blocks and provided with collars 70, engaged by springs 71, so that the studs and gripping blocks carried thereby are yieldingly pressed forward. Behind the springs are the adjusting members 72 threaded into projections on the arms 63. This provides a means for adjusting the gripping pressure imposed by the arms upon the cable. In order to release the cable when the cars reach the ends of the tracks, the cam members 73 are employed, such cam members being adapted to engage suitable rollers 74 at the ends of the arms 63 and raise such arms sufficiently to release the cable. The location of the relief cams will be seen by reference to Figs. 1 and 1ª.

Figure 11:
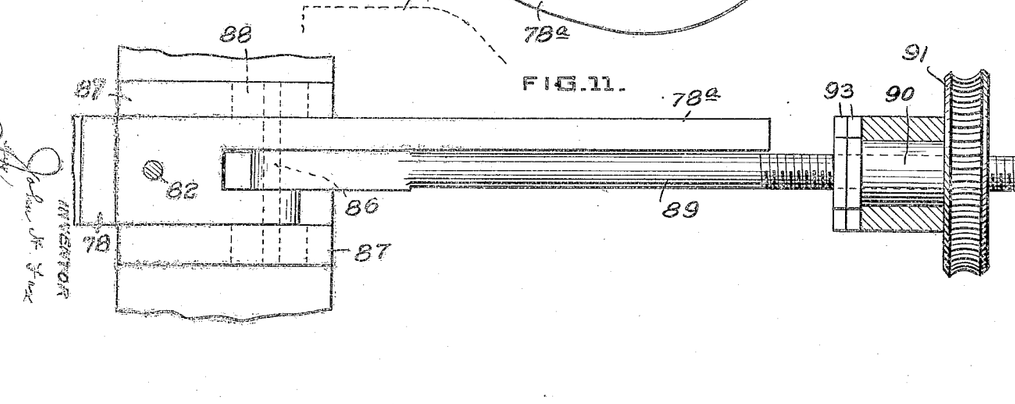
Fig. 11 is a plan view of one part of the coupling device shown in Fig. 10.

The arrangement for coupling the cars together, so that there is no relative vertical movement at such ends incident to irregularities in the track, will be understood by reference to Figs. 10 and 11. This feature involves the idea of supporting the end of one car upon the end of the car next adjacent. This requires that each car should be slightly lower at one end than at the other, and in coupling the cars, the coupling device is employed to bring the ends of the cars in such relation that the weight of the low end of the one car is transferred to the high end of the adjacent car, this being accomplished by means of inclined surfaces on the two ends. The difference in height between the two ends of each car may be varied within certain limits, but is preferably about one eighth of an inch and the abutting ends of the cars are preferably arranged with stop means, so that no further relative movement can occur after the top surfaces of the two ends have been brought to the same level.

Referring now to the coupling arrangement preferably employed as shown in Figs. 6, 7, 10, and 11, 75—75 (Figs. 6 and 10) are two inclined surfaces on one car adapted to cooperate with two oppositely inclined surfaces 76—76 at the end of the next car, the end 79 of the car having the surfaces 75—75 being preferably about $\frac{1}{8}''$ higher than the end 81 of the car having the surfaces 76—76, so that when the parts are brought to the position of Fig. 10 with the vertical end surfaces at 77 in contact, the top surfaces of the two cars are brought to a level and the weight of the car end 81 having the surfaces 76 is borne by the car end 79 having the surfaces 75.

In order to couple the cars together and secure the cooperation above described between the inclined surfaces to transfer the weight of the low end of the one car to the high end of the adjacent car, the coupling member 78 is employed (Fig. 10) carried by the high car end 79 and engaging the plate 80, bolted to the low car end 81. The member 78 is yieldingly held in its upper position, as shown, by means of the pin 82 and spring 83. This permits the inclined end 84 to be cammed down when it engages the inclined end 85 on the plate 80, so that the parts may move past each other to the engaging position shown. The member 78 is pivoted upon the pin 86 carried by the downwardly projecting brackets 87 on the car end 79, the brackets being provided with the slots 88, so that the member 78 may be moved longitudinally with respect to the car end 79 in bringing the two car ends to the position shown. This longitudinal movement is accomplished by means of the draw bar 89, engaging the pivot 86 at its front end (Fig. 11) and threaded at its rear end through the hub 90 of the worm wheel 91. The worm wheel is held against longitudinal movement with respect to the bracket 92 by means of the nuts 93 threaded to the hub of the wheel. The worm wheel is rotated by means of the worm 94 on the shaft 95, provided at its end with the hand wheel 96 (Fig. 6). In this manner power means is provided for pulling the ends of the cars together after the member 78 has engaged the plate 80 until the stop surfaces at 77 engage, thus causing the low end 81 to ride up on the high end of the end 79, bringing the top surfaces of the two cars to the same level, and throwing the combined weight of the adjacent ends of the cars upon the wheels of the car having the high end. In order to provide for the automatic uncoupling of the cars when they reach the end of the tracks, the arm 78$^a$ is provided on the member 78. When this arm is pushed up it swings the forward end of 78 down releasing it from the plate 80. To accomplish this function automatically, suitably shaped cams 78$^b$ are provided at the ends of the tracks (Figs. 1, 1$^a$ and 10).

In operation, glass from the rough racks 30 is supplied to the racks 31 along the left hand end of the track 1 and is from this point placed upon the tops of the cars 7 and secured in position either by means of plaster or by means of the clamping devices shown in Figs. 6 to 11. The cars are then moved by hand along the track 1 until they arrive adjacent the end grinders 4. During this movement the release cam 73 moves the gripping arms 63 (Fig. 5) to open position, so that the blocks 68 receive the cable 51 between them. When the rollers on the arms 63 pass off of the release cam, the cable 51 is gripped by the blocks 68, and the car is in this way secured to the endless cable. While this is going on, the next car is brought to position behind the first one and secured thereto by means of the coupling device shown in Figs. 10 and 11, the cars being brought tightly together so that the low end of the one is supported on the high end of the other with the top surfaces of the two cars in alignment. This insures that the series of glass plates upon the successive cars shall have their upper surfaces more nearly in the same horizontal plane than if the cars were independent of each other, and could independently follow the inequalities which might exist in the track. There is thus no jarring action incident to the operative contact of the grinders and polishers being shifted from glass on one car to that on the car behind, the ends of the adjacent sheets of glass being at substantially the same level.

The train of cars, thus linked together and continuously added to, is first passed beneath the series of grinders 4, and finer and finer abrasive being applied as the cars move along. When the cars arrive at the space 6, the abrasive is thoroughly washed away preparatory to the polishing operation, and this polishing operation occurs as the cars move beneath the successive polishers 5—5 until they reach the right hand end of the track 1 (Fig. 1$^a$). As the cars pass the release cam 73, the cable 51 is released after which the cars are uncoupled by the cam 78$^b$, and the car is moved upon the turntable 23. It is then carried by the transverse track 29 to the turntable 24 by means of which the car is shifted to the return track 3. The car is moved along this track until it is secured to the operating cable (the release cam 73 coming into play as heretofore described) and is in this way moved to the left hand end of the track. Here the car is released from the cable by the cam 73 and the cars uncoupled by the cam 78$^b$ and shifted over to the track 3 (Fig. 1), this being accomplished either by the turntables 19 and 20 and track 28 or by means of the turntable 22 in conjunction with the turntables 19 and 20. The track 28 in connection with the turntable 22 gives extra track space for storage of as many extra cars as it may be found convenient to have at this point in the system. If the cars are of small size and the sheets being handled are small, they may be turned over by hand at some point in the line of transit from the track 3 to the track 2, so that the rough surface is turned up for grinding and polishing on the track 2. If, however, the cars and sheets are of large size, it will be desirable to employ some other method for turning these sheets upside down upon the cars. Preferably this will be accomplished by running the cars onto the turntable 22, and after the sheets are released from the clamping devices, they will be carried by a vacuum lifting frame on suitable overhead transfer devices and carried to the transfer racks 31$^a$. These transfer racks are preferably of the type shown in the Bechtel Patent No. 1,324,785, being arranged in pairs, so that by transferring the sheets from one rack to the other, the surface exposed to the action of the vacuum cups on the vacuum frame is thus reversed. The sheets are then transferred by the lifting frame from these racks to the cars which have been brought over onto the track 3.

The sheets are secured upon the cars with their rough sides up and carried beneath the grinders and polishers on the track 2 in the same manner as heretofore described in connection with the track 1. At the right hand end of this track (Fig. 1$^a$), the cars are released from the operating table, and after the cars are moved onto the track 29 or turntable 27, the glass is released and placed upon the finished racks 31$^b$, while the empty cars are shunted back by means of the turntables 27 and 24 to the track 3, and alternating with the cars carrying the glass from the track 1, are carried back to the left hand end of the tracks where they are shifted by means of the turntables to the end of the track 1, thus completing the cycle.

Figure 12:
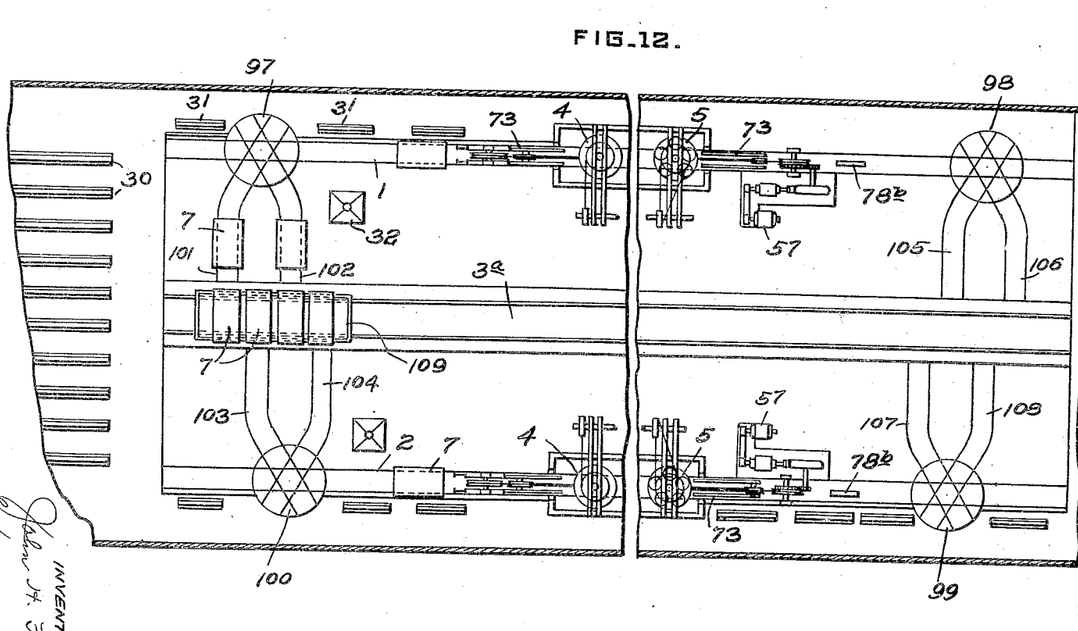
Figs. 12, 13 and 14 are plan views of modified arrangements for securing the transfer of the cars employed between the work tracks and the return track

Fig. 12 illustrates a modification which differs from that heretofore described only in that the transfer devices at the ends of the three tracks are modified. The work tracks, grinding and polishing mechanism and cars are the same throughout and are given the same reference numerals on the drawings as those employed in the Fig. 1 and 1ª construction. This system involves the use of a transfer car 109 on the return track onto which the cars 7 are run in order to transfer them from one end of the system to the other. Referring to the drawing, 97, 98, 99 and 100 are turntables arranged at the ends of the tracks 1 and 2. 101, 102, 103, 104, 105, 106, 107 and 108 are cross tracks and 3ª is the return track upon which are mounted one or more transfer cars 109. The transfer cars are provided with a plurality of cross tracks adapted to receive the cars 7 as indicated in the drawing. The transfer car is shown as having a capacity for four of the work cars 7, but this may be varied to suit requirements. Any suitable means may be employed for carrying the transfer cars from one end of the track 3ª to the other. In the operation of the apparatus, after the cars 7 reach the right hand end of the track 1, they are transferred from the transfer table to the tracks 105 and 106 and thence to the transfer car 109, which at this time is positioned opposite the ends of the tracks 105 and 106 so that the cars 7 may be run onto the cross tracks on the transfer car. The two tracks 105 and 106 are provided in order to furnish additional storage capacity, as is also the case in connection with the other turntables where two cross tracks are employed in each case. While the transfer car 109 is receiving the work cars from the tracks 105 and 106, it is also being loaded with empty cars from the tracks 107 and 108. After the transfer car is loaded it is moved to the position shown in the drawing, and the empty work cars transferred to the tracks 101 and 102, while the other cars with the sheets of glass thereon, having their upper surfaces finished, are transferred to the tracks 103 and 104 and thence to the track 2 for the surfacing of the rough side of the sheets.

Figure 13:
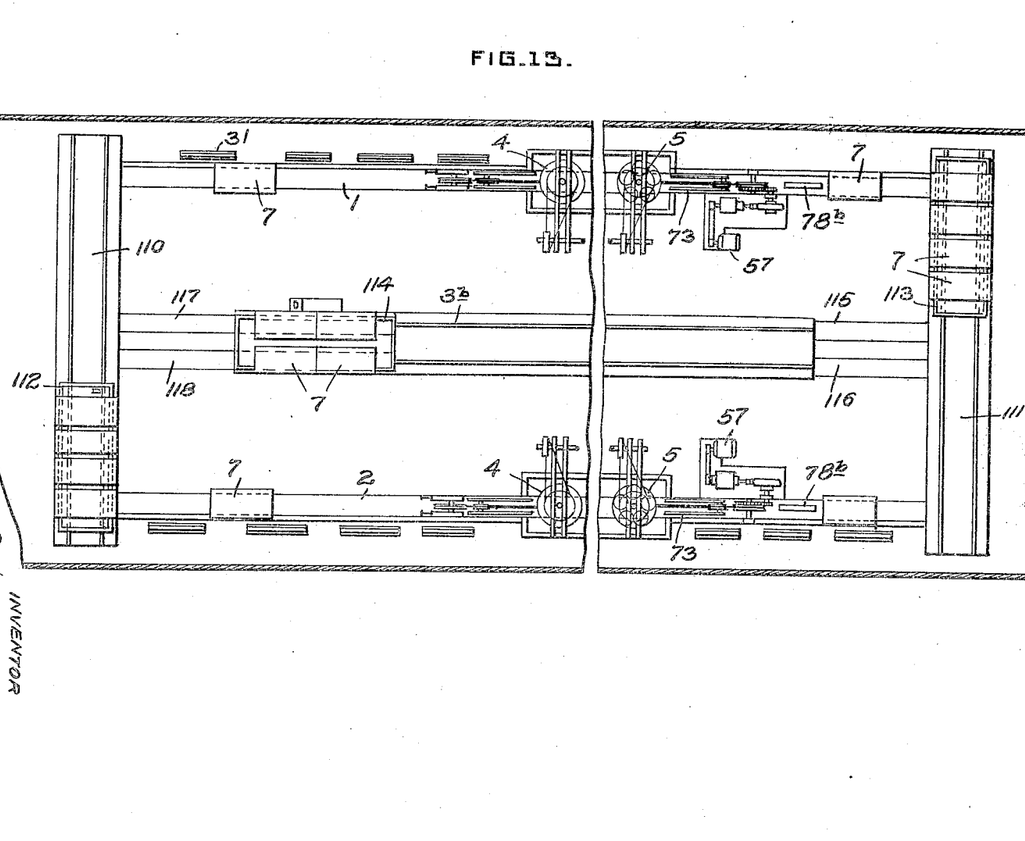

Fig. 13 illustrates another modification in which the description with respect to Fig. 12 applies except that the transfer system is modified. In this system the turntables are done away with and in place thereof transfer tracks are used at the ends of the three main tracks, such transfer tracks being provided with suitable transfer cars. These transfer cars shift the work cars between the tracks 1 and 2 and the return track, the return track being provided with a transfer car or cars adapted to receive the work cars and carry them from one end of the return track to the other. Referring to the drawings, 110 and 111 are the cross transfer tracks at the end of the system. 112 and 113 are transfer cars mounted upon the tracks 110 and 111 and 3ᵇ is the return track upon which is mounted the transfer car 114 adapted to carry the work cars 7 from one end of the return track to the other. In operation, the cars 7 as they arrive at the right hand end of the track 1 are run upon the cross tracks on the car 113 until such car is filled as indicated in the drawing. The transfer car is then moved over so that its cross tracks are successively brought into alignment with the tracks 115 and 116. The cars are then run onto these tracks 115 and 116 and shifted to the transfer car 114 which at this time is positioned with its pair of longitudinally extending tracks in alignment with the tracks 115 and 116. After the car 114 is loaded, it is moved along the return track 3ᵇ to the position indicated in the drawing. The cars 7 can now be moved along the tracks 117 and 118 and transferred to the transfer car 112 by which they may be shifted along the track 110 and then moved onto the track 2. They are then carried along this track beneath the grinders and polishers to the right hand end of said track. The track 111 is also provided with another transfer car (not shown) adapted to transfer the empty cars from the track 2 over to the tracks 115 and 116 and thence to the car 114 on the return track. These cars are then carried to the left hand end of the track 3ᵇ and shifted by means of the tracks 117 and 118 to the transfer car 112 and then over to the track 1.

Figure 14:
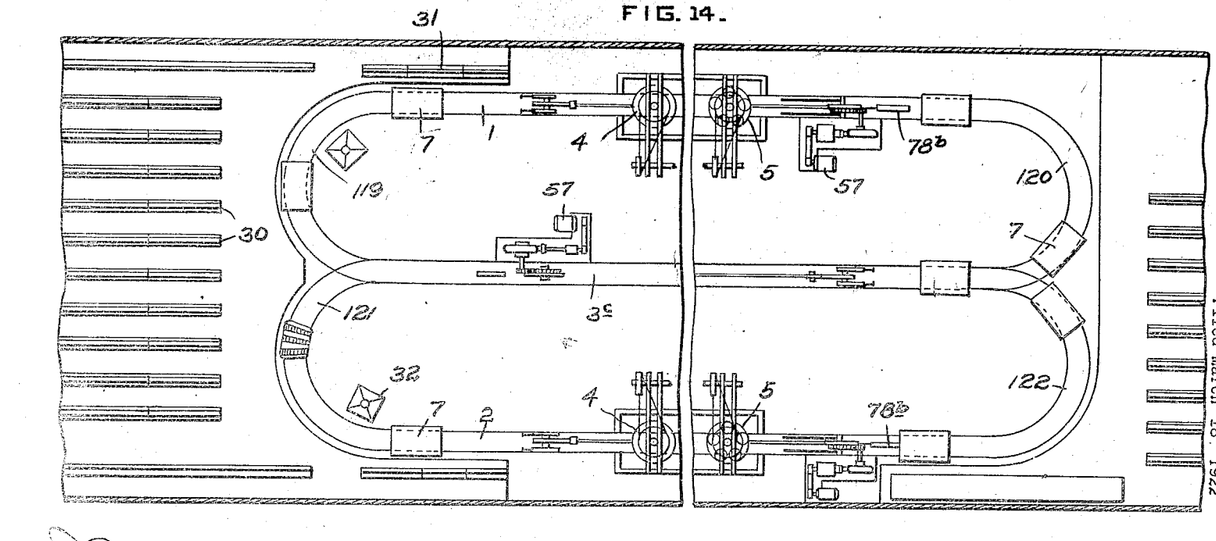

Fig. 14 illustrates still another modification in the apparatus for transferring the cars between the three tracks at the ends thereof. This is accomplished by the curved connecting ends 119, 120, 121 and 122. After the grinding and polishing operation on the track 1, the cars are shifted around the curved portion 120 to the return track 3ᶜ and carried to the left hand end thereof where they are shifted to the portion 121, thus delivering them to the track 2, and after the sheets are turned over the rough side is ground and polished on the track 2. Arriving at the right hand end of the track 2, the sheets are removed and the empty cars shifted around the portion 122 and the return track 3ᶜ. They are then carried to the starting end of the system where the empty cars are shifted around the portion 119 to the track 1, thus completing the cycle.

Fig. 15 indicates in end elevation the racks 31 arranged along the forward ends of the tracks 1 and 2 for supporting the glass preliminary to placing it on the cars. The glass is transferred from the rough racks 30 to these racks 31 so that when the cars come opposite these racks it is an easy matter to tilt the sheets around their lower edges and onto the cars as illustrated.

What I claim is:

1. In combination in grinding and polishing apparatus, a pair of parallel tracks, cars for carrying the sheets to be surfaced along such tracks, grinding and polishing means arranged over the tracks along the line of travel of the cars, a return track extending along said pair of tracks, and transfer means for the cars between the three tracks at their ends.

2. In combination in grinding and polishing apparatus, a pair of parallel tracks, cars for carrying the sheets to be surfaced along such tracks, a series of grinding devices arranged along the forward portion of each of the tracks, a series of polishing devices arranged along the rear portion of each of the tracks, a return track extending along the pair of tracks, and transfer means between the three tracks at their adjacent ends, so that cars from the rear ends of the pair of tracks may be shifted to the return track, and cars from the front end of the return track may be shifted to the pair of tracks.

3. In combination in grinding and polishing apparatus, a pair of parallel tracks, cars for carrying the sheets to be surfaced along such tracks, grinding and polishing means arranged over the tracks along the line of travel of the cars, a return track between said pair of tracks, and transfer means for the cars between the three tracks at their ends.

4. In combination in grinding and polishing apparatus, a pair of parallel tracks, cars for carrying the sheets to be surfaced along such tracks, a series of grinding devices arranged along the forward portion of each of the tracks, a series of polishing devices arranged along the rear portion of each of the tracks, a return track between said pair of tracks, and transfer means between the three tracks at their adjacent ends, so that cars from the rear ends of the pair of tracks may be shifted to the return track, and cars from the front end of the return track may be shifted to the pair of tracks.

In testimony whereof, I have hereunto subscribed my name this 16th day of March, 1922.

JOHN H. FOX.